United States Patent [19]

Gagneraud

[11] 4,165,233

[45] Aug. 21, 1979

[54] TREATING MOLTEN METALLURGICAL SLAG

[76] Inventor: Francis Gagneraud, 6 Avenue des Tilleuls, Paris, France, 75016

[21] Appl. No.: 815,029

[22] Filed: Jul. 12, 1977

[30] Foreign Application Priority Data

Dec. 17, 1976 [FR] France .................. 76 38039

[51] Int. Cl.$^2$ .............................. C21B 3/04
[52] U.S. Cl. .......................... 75/24; 65/20; 106/288 B
[58] Field of Search ............ 75/24, 30; 65/19, 20; 106/288

[56] References Cited

U.S. PATENT DOCUMENTS

| 2,067,312 | 1/1937 | Coryell | 65/20 |
| 4,062,672 | 12/1977 | Kunicki et al. | 75/30 |

FOREIGN PATENT DOCUMENTS

| 137979 | 7/1950 | Australia | 75/24 |
| 1472795 | 1/1967 | France | 75/24 |
| 1489000 | 6/1967 | France | 75/24 |
| 651384 | 3/1951 | United Kingdom | 75/24 |

*Primary Examiner*—M. J. Andrews
*Attorney, Agent, or Firm*—Browdy and Neimark

[57] ABSTRACT

The invention relates to a method and compositions for modifying the physical and/or chemical characteristics of metallurgical slags and cinders by injection into the latter, during pouring in the molten state, between the ladle and the cooling pit. These compositions are mixtures of carbonate products and free carbon products in the form of wastes and residues such as mining or quarry sterile materials and blast furnace gas dusts. The injection can be effected in the presence of a support such as fine particle steel mill slag or sodium slags from pig iron desulfuration. The process is applicable to the treatment of type LD steel mill slags and phosphate slags designed for agriculture.

11 Claims, No Drawings

TREATING MOLTEN METALLURGICAL SLAG

FIELD OF THE INVENTION

The present invention relates to the field of slags and cinders obtained from the manufacture and various treatments of irons, cast irons, and steels as well as nonferrous metals. It relates particularly to new compositions which are capable of modifying the physical and/or chemical characteristics of these slags and cinders by injection into their molten mass without heat being supplied from the outside.

BACKGROUND OF THE INVENTION

It is known that crystallized slags from iron- and steel-making and the metallurgy of nonferrous metals must after cooling, undergo either a dimension reduction operation by crushing if the material is to be obtained in pieces, or by grinding to a greater or lesser degree if the material is to be reduced to a fine powder. These crushing and/or grinding operations involve high energy consumption per ton of material treated and very substantial equipment outlays and maintenance costs due to the rapid wear of the active elements of the machines.

In order to improve the crushability and/or fine grindability of the slags after cooling, it has been recommended that there be injected into the molten slags and cinders, while they are being poured from the ladle, products with a fine particle size capable of generating gases which remain imprisoned in the slag particles and give rise to cellular or alveolar materials. For this purpose one may cite: carbon black, coke fines, or, better still, compounds such as alkaline earth carbonates, such as limestone, for example, which, upon thermal dissociation, cause an endothermal reaction with the molten slag and which, after decomposition, provide slag enriching elements (See U.S. Pat. No. 4,062,672).

It has now been found that slags can be expanded and at the same time their physical and/or chemical characteristics can be modified at will while maximizing the use of the sensible heat of the molten mass at the time it leaves steel mill or blast furnace converters, by injecting specially adapted porophoric mixtures based on at least two components.

According to the principal objective of the present invention, these mixtures are composed, on the one hand, of carbonated materials and, on the other hand, of materials with a free carbon. These materials can be natural or manufactured materials. However, it has been found particularly advantageous, in the mixtures according to the present invention, to use by-products which are presently considered to be wastes and residues and are dumped unchanged on the slag heap.

DESCRIPTION OF THE PREFERRED EMBODIMENTS

As will be explained in greater detail hereinbelow, the introduction of these mixtures of pulverulent material into the molten slag, the temperature of which is generally about 1,500° C., causes a release of gas due to decomposition of the substances contained in the carbonated materials and, possibly, to the combination of this compound with certain elements already included in the slag. The gas so released is kept imprisoned in the slag until the latter solidifies completely and a cellular product is then obtained which can easily be crushed and fragmented into particles of the desired size.

Thus, according to a preferred embodiment, synthetic metal carbonates or carbonates in ore form or calcareous sands can be replaced by mining or quarry wastes rich in calcium carbonate which can contain water of composition.

In the same way, with regard to free carbon products, it is advantageous to replace coke fines, which have a certain market value, by blast furnace gas dusts which are usually trapped in cyclone collectors. These dusts can contain 10–30% free carbon.

The process of the present invention can be implemented according to any process known of itself for incorporating a substance pulverulent at normal temperatures into a mass of slag and/or cinder raised to a temperature of over 1400° C. It is important, however, that the mass of slag be at a temperature sufficiently low to permit the capture of the gases being evolved while the slag is solidifying, thus creating a porous solid, while still high enough to permit the endothermal reaction to take place.

In the conventional method of disposing of slag, particularly that produced as the output in the course of smelting or refining of metals, the molten slag is poured into ladles or pans and transported to a slag yard, which may be far from the converter. The ladles of molten slag are then emptied into pits in the slag yard. After solidification, the cold slag is then dug up by bulldozer or fork-lift, collected and then crushed.

The temperature of the slag being poured from the ladle into the cooling pit is generally within that range which is operable in accordance with the present invention, i.e., not so high as to release the gases, with attendant risk of explosion, or to create substantial foaming, nor so low as to prevent the reaction releasing the gases.

Preferably, a satisfactory technique consists of injecting the pulverulent material into the sheet of slag, while it is being poured between the ladle and the cooling pit.

To determine the proper respective proportions of each of the components in the compositions according to the invention, one must take into account the parts played, particularly with regard to the heat balance, by the elements added to the slags from the making of iron, steel, and other metals. For example, it is known that decomposition of carbonates (for example alkaline earth carbonate) is endothermal; the cooling power is thus raised upon injection into the molten slag. On the other hand, oxidation of carbon is exothermal. The direct reduction of iron oxides by carbon is endothermal, while indirect reduction of these same oxides by carbon monoxide is effected with practically no heat exchange. It is thus possible to modulate the type of foaming treatment with a drop in temperature according to the nature and end uses of the slags and cinders injected with the mixtures according to the invention.

Such a juxtaposition of carbonate and carbon material wastes proves favorable because it permits a combination of the rapid release of $CO_2$ from thermal decomposition of carbonates and the delayed release of the $CO + CO_2$ mixture from reduction of iron oxides, contained in the steel mill slag, by the carbon of the carbon material. The cooling power of this mixture, necessary to stabilize the slag foam, by increasing its viscosity before solidification, is situated between those of carbonated products and carbon products used separately.

In practice, it has been demonstrated during industrial operations of LD steel mill slags and phosphate slags that it was necessary for at least 4 m³ of potential gas to be released per ton of slag (volume measured under normal temperature and pressure conditions) to obtain porous granulates easy to grind and crush. This volume is reached when sufficient quantities of suitably composed materials are used, generally between 15 and 40 kg, usually between 20 and 30 kg, per ton of slag to be treated. The composition is adjusted according to the thermal condition of the slag, taking into account the various cooling capacities of the components. The aforementioned quantities are easy to inject and do not require complex equipment.

For example, when a mine sterile material/(or: tailings) is used (particle size 1-6 mm) from magnetic enrichment of a calcareous iron ore with the following composition (% by weight) is used:

| CaO: | 38 | $Fe_2O_3$: | 12 |
|------|----|------|----|
| $SiO_2$: | 15 | $Al_2O_3$: | 3 |
| $CO_2$: | 25 | combined $H_2O$: | 4 | about 23 kg of this carbonate sterile material must be injected per ton of slag to obtain the 4 m³ of gas necessary for expansion.

In the case of blast furnace gas dusts, the quantities necessary to obtain the 4 m³ of expanding gas vary between 7 and 22 kg, approximately, per ton of slag, according to the free carbon content of these dusts.

As for the respective quantities of carbonate and carbon products, they can vary in a wide range such as 10-90 kg of the former for 90-10 kg of the latter (totaling 100 kg of the mixture).

According to another characteristic of the present invention, other residues not contained in elements capable of releasing or forming gases can be added to the mixtures of the aforementioned components. Their role is to serve as a support and/or diluent, in particular because of the fineness of the gas dust particles. In addition, certain residues can serve to introduce into the slag, elements contributing to modify certain physical and chemical characteristics.

In a first embodiment for the case of nonphosphate steel mill slags, of the LD type which are to be at least partially recycled in the metallurgical process, such supports can advantageously be composed of steel mill slags themselves with a fine particle size (1-6 mm, approximately).

According to another embodiment, particularly useful when phosphate slags for agricultural fertilizers are being treated, one can add, to at least one of the components of the aforesaid mixtures, sodium slags from desulfuration of cast iron with the air of sodium-based compounds (sodium carbonate or hydroxide). It is known that these sodium slags, which are generally discarded, raise difficult environmental and pollution problems because they are easily leached, whereupon they release aqueous solutions of sodium compounds. The ingenious solution of using these residues as a source of alkaline agents for heat treatment of natural phosphates at a temperature of at least 1000° C. to obtain fertilizers (French Patent Publication No. 2,368,451 has already been proposed. The present invention provides another useful outlet for these wastes. In fact, the sodium contributed by these sodium slags enables the citric solubility of the calcium phosphate contained in the phosphate slag to be increased by giving up sodium calcium phosphates. This property is particularly appreciable when natural phosphates or similar enriching products are injected in addition to said slags as an additional support according to the invention. In practice, one can inject at least, in addition to the mixtures of carbonate and carbon products, 10 kg of sodium slag per ton of phosphate slag, thus contributing 2-3 kg $Na_2O$.

Thus, because of the improvements made by the present invention, it becomes possible to dispose of and make use of some of the mining and metallurgical waste by causing expansion and/or enrichment of slags under conditions at least as favorable as those found upon injection of materials whose market value is higher, such as alkaline earth carbonates and coke or lean coal fines.

The alveolar products obtained according to the present invention can, after fragmentation to the desired particle size, find multiple applications in construction and building, water treatment (filter beds), manufacture of abrasives, use as highway granulates, or, of course, as fertilizers, and soil alkalizers.

It will be obvious to those skilled in the art that various changes may be made without departing from the scope of the invention and the invention is not to be considered limited to what is described in the specification.

The following unrestrictive examples show how the process of the present invention can be practiced:

EXAMPLE 1

There was treated a nonphosphate steel mill slag, of the LD type (LD means: Linz and Donnawitz and corresponds with a refining process by pure oxygen used first time at these Austrian factories) having the chemical following composition (% by weight):

| $SiO_2$: | 11 to 16 | Total Fe: | 14 to 30 |
|------|----------|-----------|----------|
| $Al_2O_3$: | 1 | Mn: | 3 to 8 |
| CaO: | 42 to 49 | $P_2O_5$: | 1 to 2 |
| MgO: | 2 to 7 | S | 0.1 to 0.3 |

For the treatment, there was injected into the slag (1000 kg) poured in the molten state at about 1450° C. from the ladle into the coaling pit, a pulverulent mixture (on a average, particle diameters of about 2 to 4 mm) of 9.5 kg blast furnace gas dust having 12% carbon and 11.5 kg mine-tailing of composition (% by weight):

| CaO: | 33 | $Al_2O_3$: | |
|------|----|------|---|
| $SiO_2$: | 15 | $CO_2$: | 25 |
| $Fe_2O_3$: | 12 | combined $H_2O$: | 4 |

So, there was obtained on the cooling pit an alveolar material of volumic mass lower than 1000 Kg/m³ that is to say 3 to 4 times lower than the specific mass of initial slag. The porous material was very easy to grind, involving substantial saving of energy. The same good results have been obtained with fine sand of calcareous quarry containing about 40% of $CO_2$ instead of above mine-tailing (sterile material).

It should be observed that the use of these materials, previously considered as undesirable wastes, is very beneficial for the environment and more economical than the utilization of known pore-forming materials such as simple or mixed carbonates, natural or synthetic.

EXAMPLE 2

There were treated, in the same way as in Example 1 (injection into the molten slag pouring from a ladle), a phosphated steel slag (type basic Bessemer or similar) of composition (% by weight):

| | | | |
|---|---|---|---|
| $SiO_2$: | 5 | Total Fe: | 15 |
| $Al_2O_3$: | 0.5 | Mn: | 2 |
| CaO: | 49 | $P_2O_5$: | 16 |
| MgO: | 2 | | | with a pulverulent mixture (average particle diameter: 1.5 to 2.5 mm) of 20 kg calcareous quarry sand with 35% $CO_2$ and gas dust with 12% C (50/50) and 10 kg of sodium slag from desulfurization of cast iron. Such a mixture was injected into the flow of slag in quantity of 30 kg per 1000 kg slag and generated about 4m3 expansive gas.

This treatment, usable for a broad range of phosphated slags (6 to 22% of P2O5) gives a porous and crumbly slag, and permits to increase the citric solubility of phosphor ions contained in the phosphated slag, making easier the formation of compounds such as: 2 P2O5-2CaO-Na2O at the treatment temperature of about 1500° C.

What is claimed is:

1. A process for treating metallurgical slags and cinders to modify their physical-chemical characteristics while conserving energy consumption, and to increase their fragmentability and crushability, consisting essentially of:

injecting into the slag a pulverulent mixture of carbonate products, which release non-polluting gases into the slag by endothermal reaction utilizing a part of the sensible heat of the molten mass of the slag, and free carbon products, said injecting taking place while the slag is at a temperature sufficiently low to permit the capture of the gases being evolved while the slag is solidifying, without creating substantial foaming, but still high enough to permit the endothermal reaction to take place, thus creating a porous solid.

2. A process in accordance with claim 1 wherein said carbonate products and said free carbon products are discarded wastes and residues.

3. A process in accordance with claim 2 wherein said carbonate products are mining or quarry sterile material (tailings) with a high calcium carbonate content and which may contain water of composition.

4. A process in accordance with claim 1 wherein said free carbon products are blast furnace gas dusts recovered from cyclone collectors.

5. A process in accordance with claim 1 wherein said pulverulent mixture has particle diameters between 1–6 mm.

6. A process in accordance with claim 1 wherein said pulverulent mixture is injected in respective proportions such that a gaseous release of at least 4 m³/ton of slag is obtained.

7. A process in accordance with claim 6 wherein said pulverulent mixture is injected in a quantity of 10–30 kg per ton of slag.

8. A process in accordance with claim 1 wherein said pulverulent mixture is injected in the presence of an additional pulverulent material, said material being an inert fine particle size steel mill slag.

9. A process in accordance with claim 8 wherein said material is a sodium slag from desulfurization of cast iron, and wherein the metallurgical slag being treated is a high phosphate slag.

10. A process in accordance with claim 1 wherein the temperature of the slag during said injecting step is about 1400 to about 1500° C.

11. A process in accordance with claim 1 wherein the pulverulent mixture is injected while the slag is being poured in the molten state from the ladle into the cooling pit.

* * * * *